(12) United States Patent
Tsutsumi et al.

(10) Patent No.: US 9,461,292 B2
(45) Date of Patent: Oct. 4, 2016

(54) BATTERY SYSTEM, POWER SUPPLY SYSTEM FOR ELECTRIC RAILCARS, AND BATTERY MODULE

(75) Inventors: Kazuo Tsutsumi, Kobe (JP); Kazuya Nishimura, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 784 days.

(21) Appl. No.: 13/499,468

(22) PCT Filed: Nov. 9, 2010

(86) PCT No.: PCT/JP2010/006555
§ 371 (c)(1),
(2), (4) Date: May 11, 2012

(87) PCT Pub. No.: WO2011/058729
PCT Pub. Date: May 19, 2011

(65) Prior Publication Data
US 2012/0223576 A1    Sep. 6, 2012

(30) Foreign Application Priority Data

Nov. 12, 2009    (JP) ................................ 2009-258555

(51) Int. Cl.
*H01M 2/30*    (2006.01)
*H01M 10/50*   (2006.01)
(Continued)

(52) U.S. Cl.
CPC .............. *H01M 2/206* (2013.01); *B60L 7/14* (2013.01); *B60L 9/18* (2013.01); *H01M 10/0445* (2013.01); *H01M 10/6554* (2015.04); *B60L 2200/26* (2013.01); *B60M 3/00* (2013.01);
(Continued)

(58) Field of Classification Search
CPC .. H01M 2/206; H01M 10/5053; H01M 6/42; B60L 7/18; B60L 2200/26
USPC .............................................................. 307/9
See application file for complete search history.

(56) References Cited

U.S. PATENT DOCUMENTS 3,619,556 A * 11/1971 Deibel ................... B60S 1/3805
                                                             15/250.07
3,732,481 A *  5/1973 Mas ....................... H02M 7/219
                                                                  320/129

(Continued)

FOREIGN PATENT DOCUMENTS

CN          1440088 A     9/2003
JP     A-2001-260719      9/2001

(Continued)

OTHER PUBLICATIONS

International Search Report mailed Dec. 28, 2010 issued in International Patent Application No. PCT/JP2010/006555 (with translation).

(Continued)

*Primary Examiner* — Jared Fureman
*Assistant Examiner* — Emmanuel R Dominique
(74) *Attorney, Agent, or Firm* — Oliff PLC

(57) ABSTRACT

A battery system is configured by connecting a plurality of battery modules in series, and each of the plurality of battery modules is configured by stacking a plurality of unit batteries. A connecting terminal through which electricity is obtained is provided between a positive electrode terminal and a negative electrode terminal of at least one of the plurality of battery modules.

18 Claims, 9 Drawing Sheets

(51) Int. Cl.
- *B60L 1/00* (2006.01)
- *H01M 2/20* (2006.01)
- *B60L 7/14* (2006.01)
- *B60L 9/18* (2006.01)
- *H01M 10/04* (2006.01)
- *H01M 10/6554* (2014.01)
- *B60M 3/00* (2006.01)
- *H01M 2/10* (2006.01)
- *H01M 10/34* (2006.01)

(52) U.S. Cl.
CPC ........ *H01M 2/1077* (2013.01); *H01M 10/345* (2013.01); *H01M 2220/20* (2013.01)

(56) References Cited

U.S. PATENT DOCUMENTS

| | | | | |
|---|---|---|---|---|
| 4,670,700 | A * | 6/1987 | Henkel | H02J 7/0045 320/103 |
| 5,510,203 | A * | 4/1996 | Hamada | H01M 2/0245 429/148 |
| 5,747,186 | A * | 5/1998 | Morishita | H01M 2/0245 429/206 |
| 6,150,795 | A * | 11/2000 | Kutkut | H02J 7/0018 320/118 |
| 6,445,566 | B2 * | 9/2002 | Watanabe | 361/502 |
| 8,691,421 | B2 * | 4/2014 | Lee | H01M 2/1077 429/120 |
| 2002/0022179 | A1 | 2/2002 | Yuasa et al. | |
| 2002/0142211 | A1 * | 10/2002 | Nakanishi | H01M 2/263 429/94 |
| 2003/0082423 | A1 * | 5/2003 | Kushibiki | H01M 8/0297 429/435 |
| 2003/0148174 | A1 | 8/2003 | Gu | |
| 2003/0165801 | A1 * | 9/2003 | Levy | G09B 13/00 434/227 |
| 2004/0197650 | A1 * | 10/2004 | Kubota | H01M 4/0404 429/199 |
| 2007/0054561 | A1 * | 3/2007 | Gutman | H01M 2/206 439/656 |
| 2007/0099075 | A1 | 5/2007 | Hayashi et al. | |
| 2008/0118828 | A1 * | 5/2008 | Brennfoerder | H01M 2/24 429/160 |
| 2009/0087722 | A1 * | 4/2009 | Sakabe | B60L 3/0046 429/61 |
| 2009/0155673 | A1 * | 6/2009 | Northcott | H01M 10/4207 429/62 |
| 2009/0214936 | A1 * | 8/2009 | Yang | G01R 31/3696 429/61 |
| 2011/0043038 | A1 | 2/2011 | Tsutsumi et al. | |
| 2012/0100399 | A1 * | 4/2012 | Adachi et al. | 429/7 |
| 2014/0141290 | A1 * | 5/2014 | Pizzurro | H01M 2/1077 429/50 |

FOREIGN PATENT DOCUMENTS

| | | |
|---|---|---|
| JP | A-2001-319682 | 11/2001 |
| JP | A-2004-213922 | 7/2004 |
| JP | A-2006-120489 | 5/2006 |
| JP | A-2007-123059 | 5/2007 |
| JP | A-2009-245730 | 10/2009 |
| KR | 10-2009-0007337 A | 1/2009 |
| RU | 2 326 467 C1 | 6/2008 |
| RU | 2 343 615 C1 | 1/2009 |
| RU | 2 364 012 C2 | 8/2009 |
| TW | I254476 | 5/2006 |
| WO | WO 2009/107715 A1 | 9/2009 |

OTHER PUBLICATIONS

English-language Translation of Search Report issued in Taiwanese Application No. 099138798 dated May 21, 2013.
Partial English-language translation of Office Action issued in Russian Application No. 2012123744 dated Jul. 5, 2013.
Office Action issued in Chinese Application No. 201080049364.9 issued Apr. 3, 2014 (with partial translation).

* cited by examiner $$\frac{dV_1}{V_1} \approx \frac{dV_2}{V_2} \approx \frac{dV_3}{V_3}$$

BATTERY SYSTEM, POWER SUPPLY SYSTEM FOR ELECTRIC RAILCARS, AND BATTERY MODULE

TECHNICAL FIELD

The present invention relates to a battery system, a power supply system for electric railcars, and a battery module, which are used in ground power storage devices, vehicles, and the like.

BACKGROUND ART

Conventionally, a general substation for electric railcars converts AC power, supplied from, for example, an electric power company, to DC power and supplies the DC power to a feeder. Electric vehicles receive the DC power from the feeder through an overhead contact line to run. In the case of subways and the like, the electric power is supplied through a third rail, instead of the overhead contact line.

When the electric vehicle accelerates, the electric power supplied through the overhead contact line is supplied to a running motor through an electric power controller mounted on the vehicle. Thus, electric energy is converted into running energy, and the electric vehicle runs. When the electric vehicle accelerates, the electric vehicle requires a large amount of electric power. Therefore, the voltage of the overhead contact line or the like drops. Although it depends on the degree of the voltage drop, the voltage drop of the overhead contact line may adversely affect the running of the other electric vehicle running in the same section.

When an electric vehicle having a regeneration capability decelerates, running energy of the electric vehicle is converted into electric energy by using the running motor as a power generator. The obtained electric power is called regenerative electric power.

To return the regenerative electric power to the overhead contact line, an electric power controller mounted on the electric vehicle performs a control operation of increasing the voltage of the overhead contact line. Therefore, the voltage of the overhead contact line generally increases.

Of course, if another electric vehicle running at the same time as the above electric vehicle is accelerating, the regenerative electric power is consumed by the other electric vehicle. However, if there is no electric vehicle consuming the regenerative electric power, the voltage of the overhead contact line increases, and the electric power controller performs a control operation of suppressing the generation of the regenerative electric power in the electric vehicle when the voltage is equal to or higher than a certain voltage. This operation is generally called regenerative reduction. Further, if the voltage of the overhead contact line increases more, the electric power controller of the electric vehicle performs a control operation of terminating the regeneration. This operation is generally called regenerative invalidation.

If the regenerative reduction or the regenerative invalidation occurs, a mechanical brake is activated to obtain necessary deceleration, and the running energy is converted into heat energy to be dissipated.

To prevent the regenerative invalidation, a method may be used, in which to consume the regenerative electric power in the substation, a chopper is used, and the regenerative electric power is converted into the heat energy by an electric resistor. However, even in this case, the regenerative electric power is wastefully dissipated.

Moreover, to prevent the regenerative electric power from being wasted, there is a method in which: for example, an inverter configured to convert the regenerative electric power into the AC power is provided in the substation; surplus regenerative electric power is converted into the AC power having commercial power frequency; and the AC power is transmitted inversely or is utilized in stations and the like. In this case, although the regenerative electric power can be effectively utilized, this method requires an expensive inverter.

Also proposed is that: a large-scale battery system is provided in a substation; a surplus regenerative electric power is accumulated by charging the battery system with the surplus regenerative electric power; the battery system discharges the surplus regenerative electric power when the voltage of the overhead contact line drops; and thus the voltage drop of the overhead contact line is suppressed (see PTL 1, for example). Such a battery system has been attracting attention from the viewpoints of the effective utilization of the regenerative electric power and the retention of the running performance by the retention of an appropriate voltage of the overhead contact line.

Proposed is an electric power supply system which realizes the effective utilization of the regenerative electric power by using a battery system provided in a substation without using a charge and discharge controller and complements an electric power transfer capability of the substation (see PTL 2, for example).

CITATION LIST

Patent Literature

PTL 1: Japanese Laid-Open Patent Application Publication No. 2001-260719
PTL 2: International Publication No. 2009/107715

SUMMARY OF INVENTION

Technical Problem

An electric power supply system for electric railcars is proposed, which is provided with a large-scale battery system in a substation and accumulates the regenerative electric power (see PTL 1). However, this electric power supply system requires the charge and discharge controller configured to appropriately adjust the voltage of the battery system and be connected to the overhead contact line.

This is because in the case of a normal secondary battery, an output voltage (to be precise, terminal voltage) relative to a battery SOC (state of charge) changes so significantly that a method of connecting the battery system to the overhead contact line through the charge and discharge controller is used for the purpose of adjusting the voltage of the battery system to the voltage of the overhead contact line. The charge and discharge controller is expensive and requires an installation space. These are factors that prevent the spread of such a battery system.

In the case of a nickel-metal hydride battery, the change in the output voltage (to be precise, terminal voltage) relative to the battery SOC (state of charge) is small, and the charge and discharge controller is not required for the purpose of adjusting the output voltage of the battery to the voltage of the overhead contact line (see PTL 2).

In the case of configuring a battery system by connecting in series a plurality of battery modules each configured by stacking a plurality of unit batteries, the output voltage of the battery system can be adjusted in a unit of the output voltage of the battery module. Therefore, even in the case of the nickel-metal hydride battery, the charge and discharge controller is required if a predetermined output voltage is desired.

The demand of the appropriate adjustment of the output voltage of the battery system exists not only in the electric power supply system for electric railcars but also in electric power supply systems for general industry. However, the output voltage of a large-capacity battery having a module structure cannot be changed appropriately.

For example, in a case where a nominal voltage is 820 V, the battery system may be assembled in such a manner that: the output voltage per unit battery is 1.367 V; 30 unit batteries are connected in series to form one battery module; and 20 battery modules are connected in series (output voltage; 30×1.367 V×20=820 V).

Due to the performances of a transformer and a rectifier, the states of use of the transformer and the rectifier, and the operation condition of an electric vehicle as a load, the system is not necessarily operated at the nominal voltage and may be operated at a voltage different from the nominal voltage. In this case, if the number of battery modules is 19, the output voltage is 779 V (30×1.367 V×19=779 V), and the output voltage of the battery system cannot be adjusted to between 779 V and 820 V.

Even if the nominal voltage is 820 V, the actual voltage may be different from the nominal voltage. When the battery system is connected to the overhead contact line, the voltage level of the overhead contact line may be changed by the influence of the battery system depending on the specification (such as battery capacity) of the battery system. In this case, the factory default output voltage becomes different from an appropriate voltage level.

To effectively charge the battery system with the regenerative electric power and supply the electric power of the battery system to the overhead contact line when necessary, it is desirable that the SOC of the battery system be about 80% in light of the performance of the battery system. This is because: if the SOC is too high, the capacity for absorbing the regenerative electric power becomes small; and if the SOC is too low, the electric power shortfall occurs when the electric power of the battery system is necessary. Therefore, to operate the battery system in a state where the SOC is about 80%, there is a demand for the adjustment of the output voltage within an appropriate range. In this case, according to the above-described calculation example, the problem is that the voltage adjustment is performed in units of 41 V.

The output voltage of the battery system can be adjusted by preparing a battery module in which the number of unit batteries stacked is less than 30 (e.g., 10 or 20) among the battery modules each normally including 30 unit batteries. However, in this case, such a battery module needs to be manufactured separately, which deteriorates production efficiency. In addition, since the battery system is configured such that a large number of battery modules are incorporated in a cabinet, incorporating the battery module including less than 30 unit batteries in the cabinet on the scene after the shipment from the factory is a demanding task because the battery module is a heavy load (for example, 240 kg).

The foregoing has explained a case where the nominal voltage is 820 V, and each battery module includes 30 unit batteries. However, the same problems as above occur even if the nominal voltage and the number of unit batteries in each battery module are different from the above values.

In order to solve the above problems, an object of the present invention is to provide a battery system configured by connecting a plurality of battery modules in series and capable of easily adjusting an output voltage of the battery system.

Solution To Problem

A battery system according to the present invention is a battery system configured by connecting a plurality of battery modules in series, each of the battery modules being configured by stacking a plurality of unit batteries, wherein a connecting terminal through which electricity is obtained is provided between a positive electrode terminal and a negative electrode terminal of at least one of the plurality of battery modules.

According to this configuration, in the battery system configured by connecting the plurality of battery modules in series, the connecting terminal other than the positive electrode terminal through which the electricity on the high potential side is obtained and the negative electrode terminal through which the electricity on the low potential side is obtained is provided between the positive electrode terminal and negative electrode terminal of the battery module. With this, a voltage lower than the voltage between the positive electrode terminal and the negative electrode terminal can be obtained. Thus, the output voltage of the battery system is adjustable. As above, the connecting terminal is provided between the positive electrode terminal and the negative electrode terminal and is used to obtain the voltage between the positive electrode terminal and the negative electrode terminal. Thus, the connecting terminal serves as a center tap. The battery module including the connecting terminal may be any one of the plurality of battery modules. It is preferable that the battery module including the connecting terminal be a last-stage battery module among the plurality of battery modules connected in series, the last-stage battery module being located on the lowest potential side, or be a first-stage battery module among the plurality of battery modules connected in series, the first-stage battery module being located on the highest potential side.

The connecting terminal may be one of a plurality of connecting terminals provided at the at least one of the plurality of battery modules, and the plurality of connecting terminals are respectively connected to a plurality of positions which are located in the battery module and are different in potential from one another. The number of connecting terminals may be one to four but is preferably two. If the number of connecting terminals is large, the output voltage can be precisely adjusted. However, manufacturing time and labor increase.

It is preferable that the unit batteries be nickel-metal hydride batteries. By using the nickel-metal hydride batteries, the change in the output voltage relative to the SOC (state of charge of a battery) can be made small. Therefore, the battery system can be effectively utilized over the entire battery SOC range without the charge and discharge controller.

It is preferable that: an intermediate current collector be provided between the unit batteries; and the connecting terminal be attached to the intermediate current collector. Since the connecting terminal is provided to draw the electricity to the outside of the battery module, the intermediate current collector is provided in the battery module, and the connecting terminal is provided at the intermediate current collector. With this configuration, the electricity can be easily obtained from the battery module.

It is preferable that the intermediate current collector be subjected to nickel plating. This is because: by the nickel plating, the contact resistance becomes small, and equivalent internal resistance as a battery decreases; and therefore, the efficiency of the battery system improves.

A heat release plate configured to release heat generated in the unit batteries may be provided between the unit batteries, and a thickness of the intermediate current collector may be equal to a total thickness of one unit battery and one heat release plate or a total thickness of one unit battery and two heat release plates. By setting the thickness of the intermediate current collector as above, the standardization of the size of the battery module can be realized. This is because in the battery module not including the connecting terminal, the intermediate current collector can be provided at a position at which the unit battery or the like is normally stored. With this, product yield improves, and the increase in manufacturing cost can be suppressed.

The battery modules are preferably stored in a cabinet. Storing the battery modules in the cabinet simplifies the maintenance and is preferable for security reasons. By installing an air conditioner or the like in the cabinet, the battery modules can be efficiently cooled as a whole.

In the battery system according to the present invention, preferably, the cabinet may be provided with a plurality of power supply terminals for external connection, and the plurality of power supply terminals may be electrically connected to the connecting terminal, the positive electrode terminal, and the negative electrode terminal. More preferably, the power supply terminals for external connection may be stored in a terminal box with a lid, and the terminal box may be provided at the cabinet. With this configuration, the output voltage of the battery system can be adjusted from the outside of the cabinet, and the time and labor for the adjustment on the scene can be reduced.

It is preferable that the connecting terminal be detachable. If the number of connecting terminals is large, all of the connection terminals are normally not used. When the connecting terminal is configured to be detachable from the intermediate current collector, the attaching of the connecting terminal not used can be omitted. If the attaching of the connecting terminal that is a charging portion is omitted, that makes it possible to simplify the use of the battery system.

A power supply system for electric railcars according to the present invention is a power supply system used in a substation for the electric railcars, the power supply system including: a transformer configured to receive electricity through an AC power line; a rectifying device connected to the transformer; and a feeder connected to the rectifying device, wherein: a battery system configured by connecting a plurality of battery modules in series is directly connected to the feeder, each of the plurality of battery modules being configured by stacking a plurality of unit batteries; and a connecting terminal through which electricity is obtained is provided between a positive electrode terminal and a negative electrode terminal of at least one of the plurality of battery modules.

According to this configuration, since the battery system is directly connected to the overhead contact line without the charge and discharge controller, the expensive charge and discharge controller is not required.

A battery module according to the present invention is a battery module configured by stacking a plurality of nickel-metal hydride unit batteries, wherein: a nickel-plated intermediate current collector is provided between the unit batteries; and the connecting terminal is attached to the intermediate current collector. This is useful when one battery module is used as a power supply, and the adjustment of the output voltage of this battery module is required.

BRIEF DESCRIPTION OF DRAWINGS

FIG. 9 is an SOC characteristic diagram showing a change in a voltage relative to an SOC of each of various batteries and the like.

Description of Embodiments

Hereinafter, an embodiment of a battery system according to the present invention will be explained in reference to the drawings. However, the present invention is not limited to this embodiment.

Figure 1:
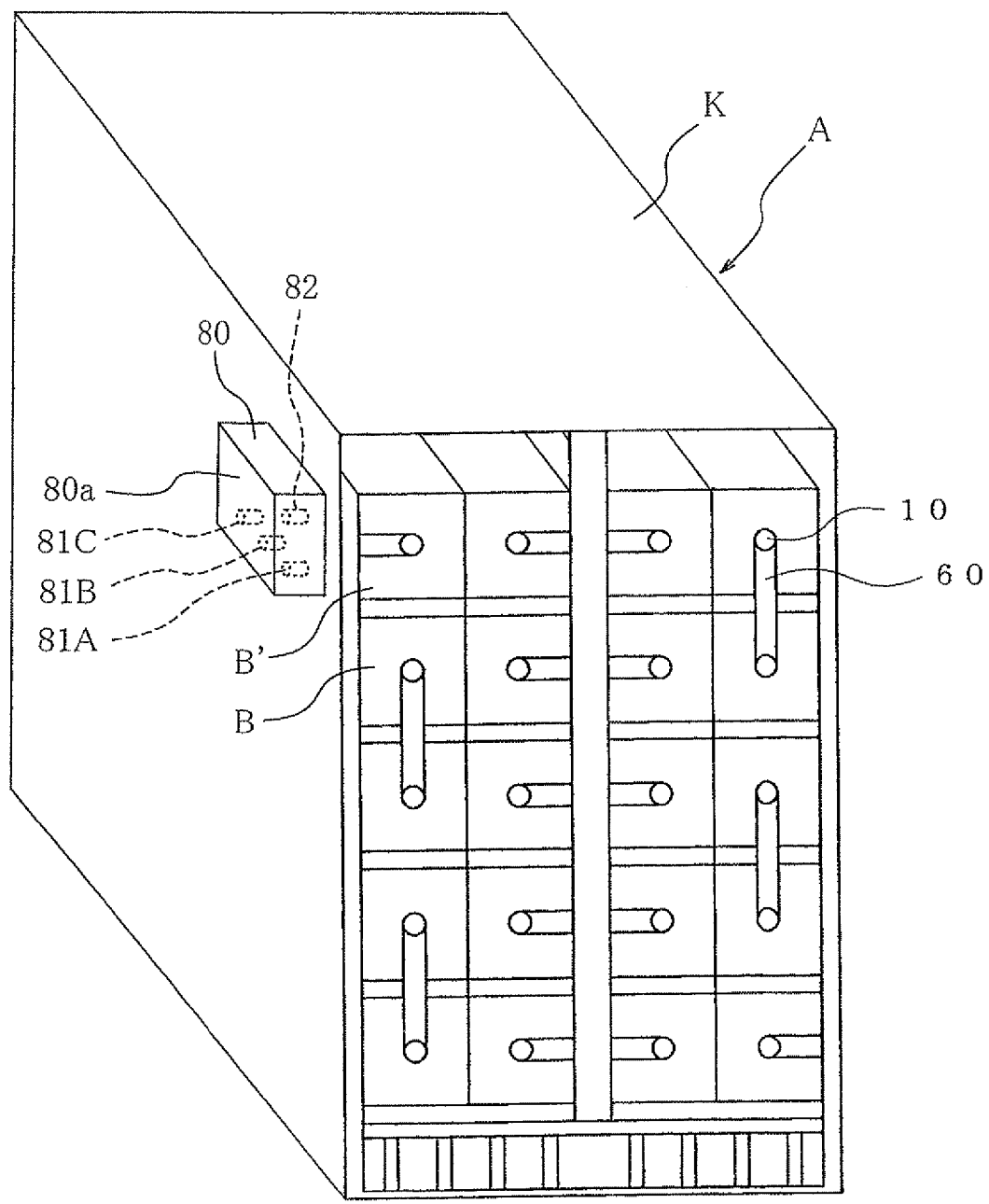
FIG. 1 is an appearance diagram of a battery system according to one embodiment of the present invention.

FIG. 1 is a perspective view showing the configuration of a battery system A according to one embodiment of the present invention. As shown in FIG. 1, twenty battery modules B are stored in an array of four rows and five columns in a cabinet K. Here, the number of battery modules B stored is determined based on a required electrical specification and is not limited to twenty. For a clear explanation, a door of the cabinet K is not shown in FIG. 1. An electrode terminal 10 of one battery module B is connected to the adjacent battery module B through a cable 60. As a whole, the battery modules B are connected to one another in series. Battery modules B and B' respectively located at both ends of the battery modules connected in series are led to the outside of the cabinet K by cables (not shown). A terminal box 80 with a lid 80a is provided on an outer surface of the cabinet K. Three positive power supply terminals 81A, 81B, and 81C for external connection and one negative power supply terminal 82 for external connection are provided in the terminal box 80. Instead of the cables, bus bars may be used.

Among twenty battery modules in FIG. 1, one battery module is the battery module B' including the connecting terminal according to the present invention, and the other nineteen battery modules are the battery modules B not including the connecting terminal. Hereinafter, first, one example of the battery module B not including the connecting terminal will be explained, and then, the battery module B' including the connecting terminal according to the present invention will be explained.

Figure 2:
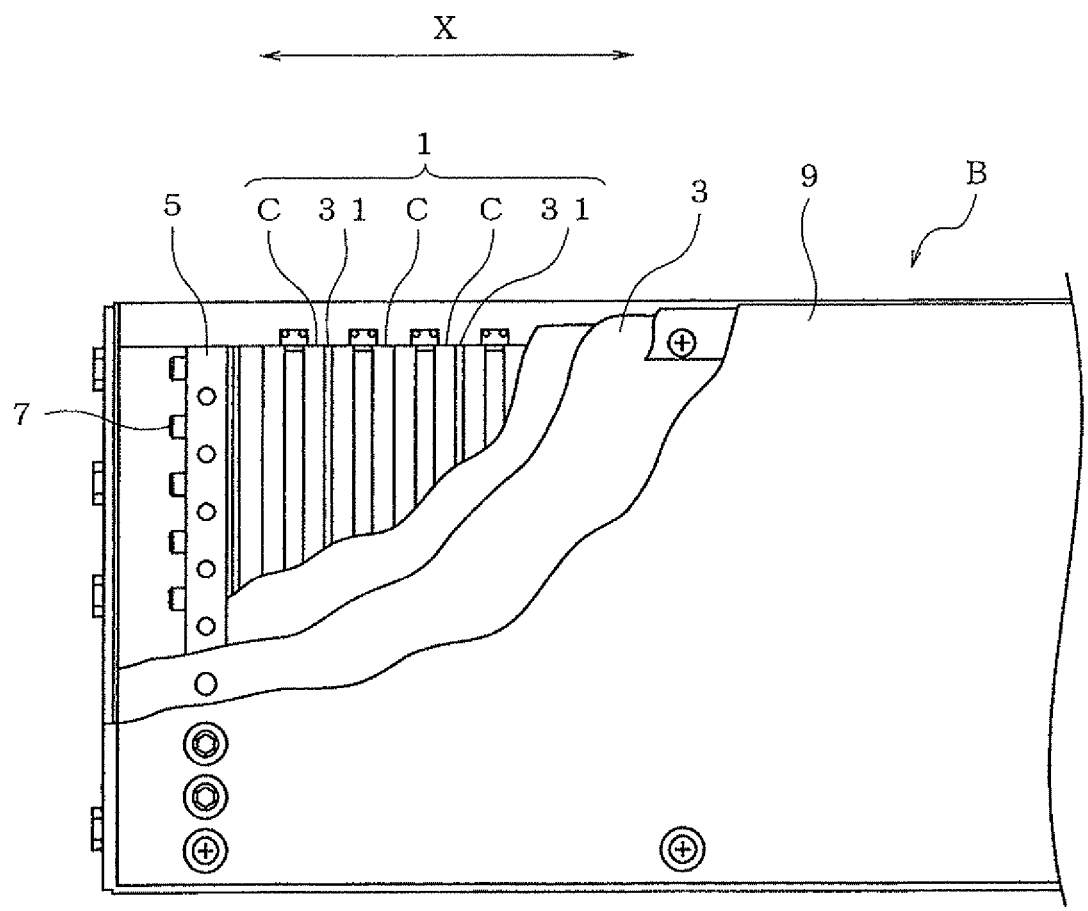
FIG. 2 is a partially broken side view showing a battery module according to one embodiment of the present invention.

FIG. 2 is a partially broken side view showing the configuration of the battery module B. The battery module B is provided in, for example, a substation for electric railcars. The battery module B includes, as major components, a battery stack body 1, side plates 3, compression plates 5, and fastening bolts 7. The battery stack body 1 is configured by stacking a plurality of (thirty in the present embodiment) unit batteries C one another in a thickness direction of the unit battery C. The unit battery C is preferably a sealed square battery. The side plates 3, the compression plates 5, and the fastening bolts 7 are provided to fasten and fix the battery stack body 1 in a stack direction X. These major components are covered with a casing 9 made of an insulating material.

Figure 3:
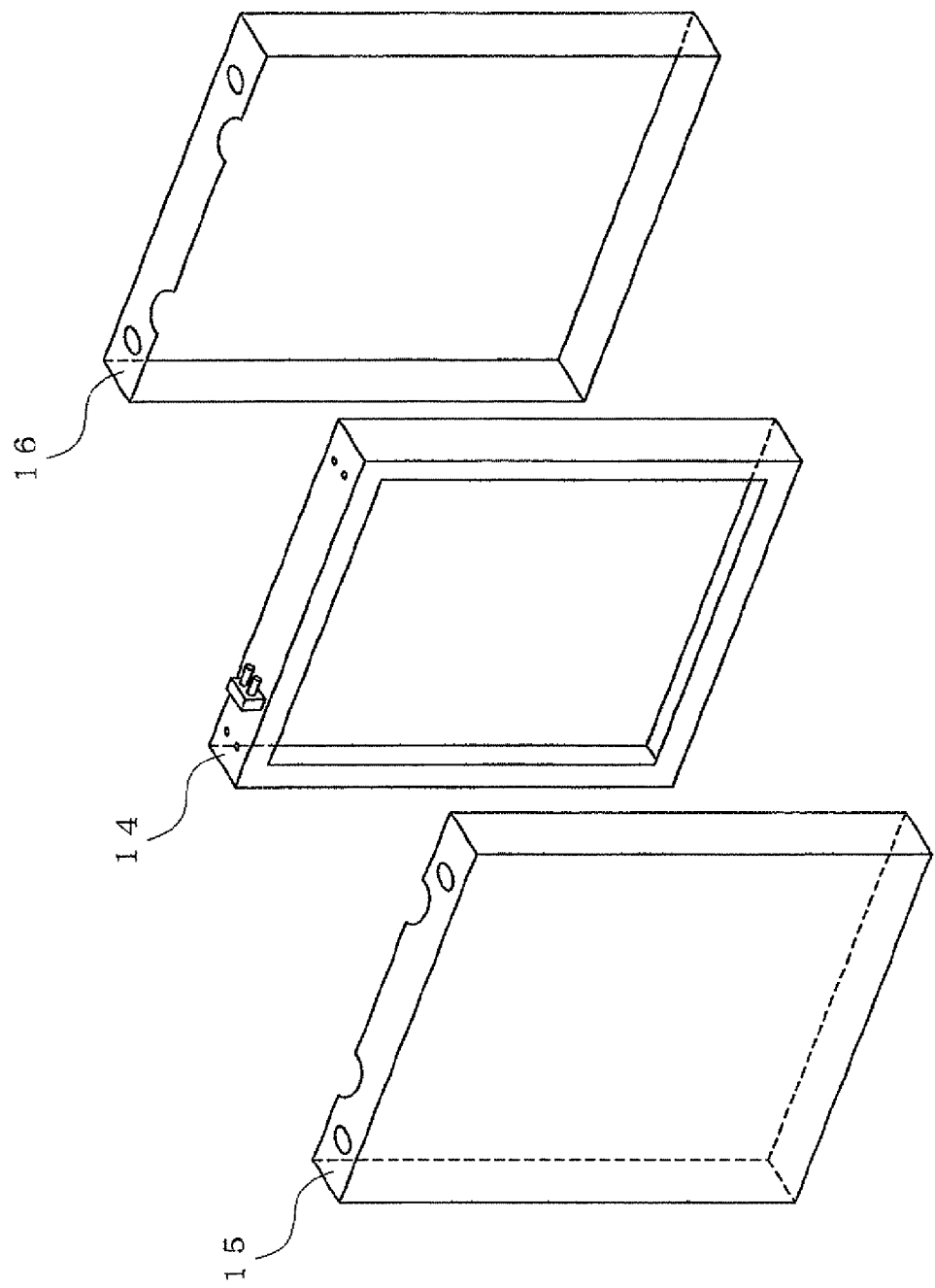
FIG. 3 is an exploded view of a unit battery used in the battery module of FIG. 2.

As shown in FIG. 3, the unit battery C includes a rectangular frame member 14, a first lid member 15, and a second lid member 16. A nickel-metal hydride battery (not shown) is stored in a space formed by the frame member 14, the first lid member 15, and the second lid member 16. As a whole, these components constitute the unit battery.

In the present embodiment, each of the first lid member 15 and the second lid member 16 is formed by a nickel-plated steel plate. The first and second lid members 15 and 16 are respectively connected to a positive electrode and negative electrode of the nickel-metal hydride battery. To be specific, the first and second lid members 15 and 16 respectively serve as a positive electrode terminal and a negative electrode terminal of the unit battery C.

Next, the configuration of the battery module B constituted by the unit batteries C will be explained. As shown in FIG. 2, the battery stack body 1 of the battery module B in the present embodiment is formed by stacking the unit batteries C and heat release plates 31. As shown in FIG. 3, the unit batteries C are stacked such that the first lid member 15 of one of the adjacent unit batteries C and the second lid member 16 of the other unit battery C are opposed to each other. Further, the heat release plate 31 is interposed between the adjacent unit batteries C. The heat release plate 31 is provided with passages (not shown) through which a cooling medium flows. In the present embodiment, one heat release plate 31 is provided for two unit batteries C. However, one heat release plate 31 may be provided for one unit battery C, that is, the heat release plates 31 may be respectively provided on both surfaces of the unit battery C.

Figure 4:
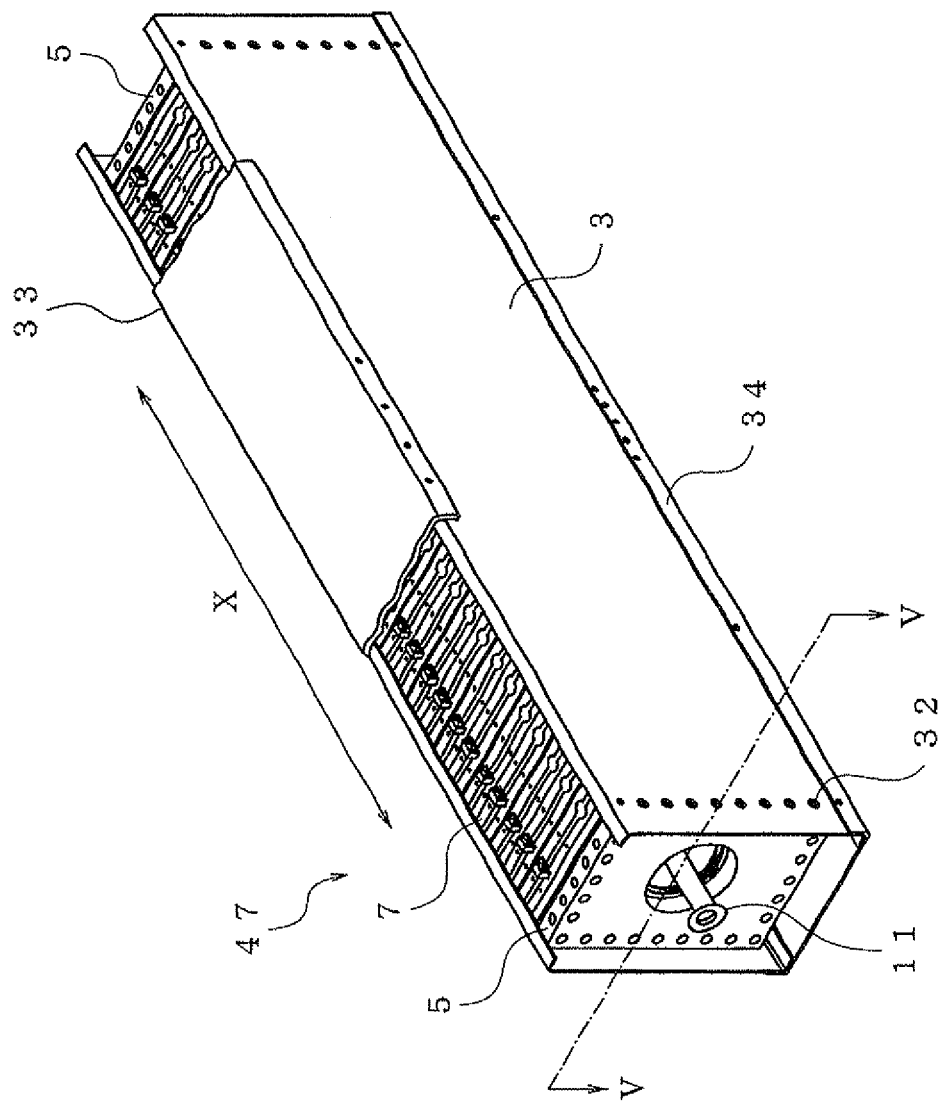
FIG. 4 is a perspective view showing an inner portion of a casing of the battery module of FIG. 2.

FIG. 4 is a partially broken perspective view showing a module main body 47 that is a major portion of the battery module B. In the following explanation, a positive electrode side (near side in FIG. 4) of the battery stack body 1 is called a front side, and a negative electrode side (far side in FIG. 4) of the battery stack body 1 is called a rear side. The side plates 3 formed as a pair of plate-shaped members extending along the stack direction X are respectively provided on both side surfaces of the battery stack body 1, the both side surfaces extending along the stark direction X. Thus, the side plates 3 respectively cover the both side surfaces of the battery stack body 1. The compression plates 5 that are plate-shaped compression members are respectively fixed to a stack-direction-X front end portion and rear end portion of each of the side plates 3 by side bolts 32. Thus, stack-direction-X front and rear surfaces of the battery stack body 1 are respectively covered with the compression plates 5 located on the front and rear sides. An upper surface plate 33 and a lower surface plate 34 that are plate-shaped members extending along the stack direction X are respectively provided on a stack-direction-X upper side and lower side of the battery stack body 1. Each of the upper surface plate 33 and the lower surface plate 34 is fixed to the side plates 3 by bolts.

Figure 5:
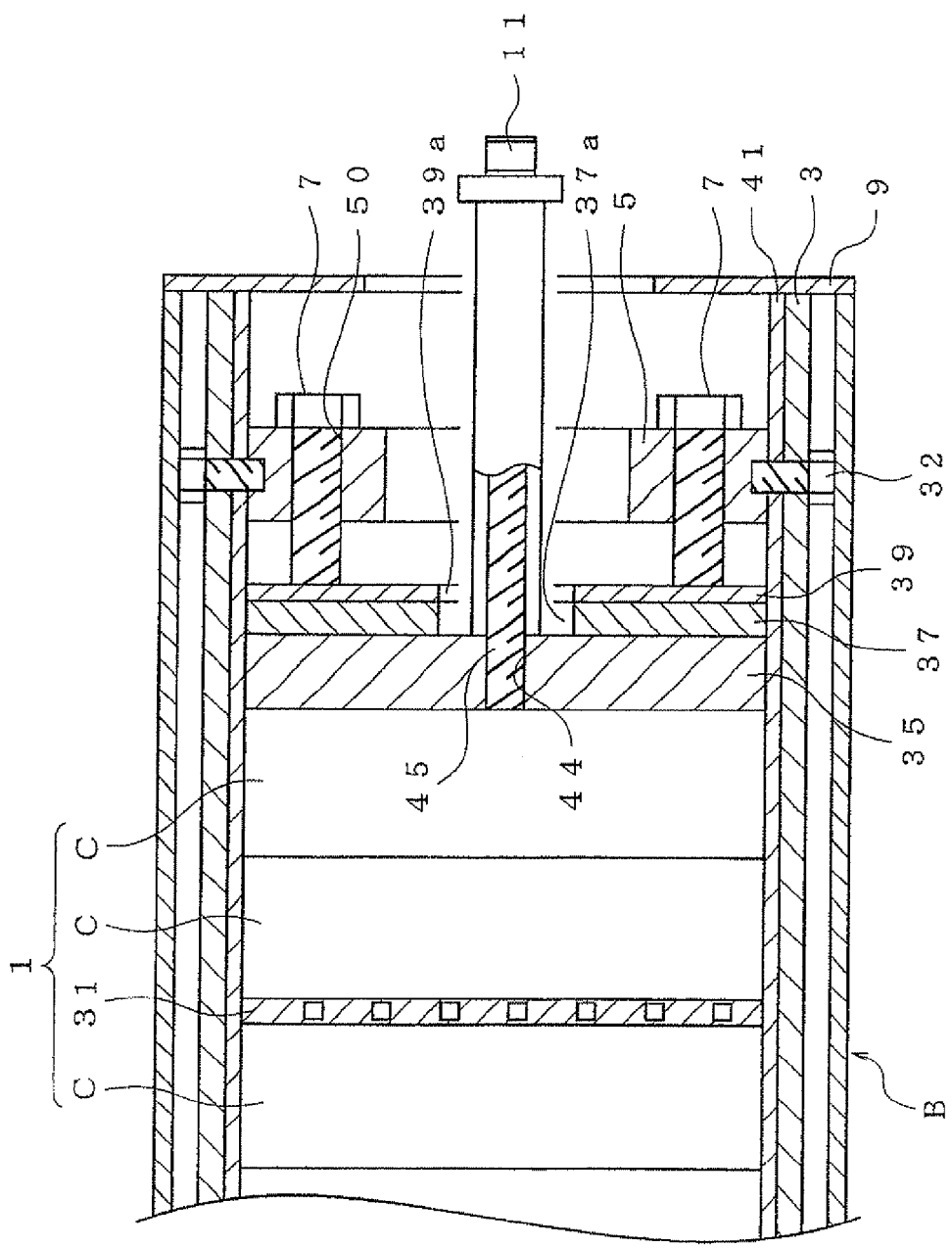
FIG. 5 is a cross-sectional view taken along line V-V of FIG. 4.

FIG. 5 is a cross-sectional view taken along line V-V of FIG. 4. As shown in FIG. 5, a first current collector 35, which is a current collecting member on the positive electrode side, is stacked on the front side of the first lid member 15 (see FIG. 3) of the unit battery C located at a frontmost portion of the battery stack body 1. Further, an insulating plate 37 and an insulating plate protection plate 39 are stacked on the front side of the first current collector 35 in this order.

A plurality of fastening bolts 7 respectively, are threadedly engaged with screw holes 50 of the compression plate 5 from the front side in the stack direction X of the battery stack body 1, to penetrate the compression plate 5. Tips of the fastening bolts 7 contact the insulating plate protection plate 39 to press the battery stack body 1 rearward along the stack direction X via the insulating plate protection plate 39, the insulating plate 37, and the first current collector 35. The rear end portion of the battery stack body 1 has the same configuration as the front end portion shown in FIG. 5. The fastening bolts 7 presses the rear end portion of the battery stack body 1 forward along the stack direction X via the insulating plate protection plate 39, the insulating plate 37, and a second current collector 36 (see FIG. 7).

Circular openings 37a and 39a are respectively formed at center portions of the insulating plate 37 and the insulating plate protection plate 39. In these openings 37a and 39a, a positive electrode terminal bolt 45 which serves as a positive electrode terminal 11 of the battery module B is threadedly engaged with a screw hole 44 formed at a substantially center portion of the first current collector 35. As with the front end portion of the battery stack body 1, at the rear end portion, a negative electrode terminal 12 (see FIG. 7) is threadedly engaged with and is attached to the second current collector 36 (see FIG. 7).

Next, the embodiment of the battery module B' including the connecting terminal according to the present invention will be explained in reference to FIG. 6. Explanations of the same components as in the battery module B will be omitted, and the same reference signs are used for the same components.

Figure 6A:
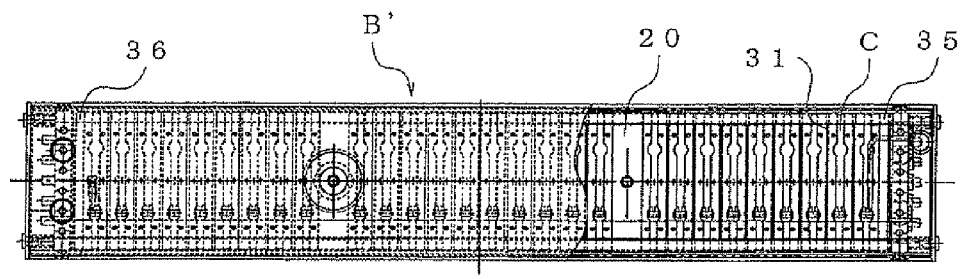
FIG. 6A is a plan view showing the battery module according to one embodiment of the present invention.
Figure 6B:
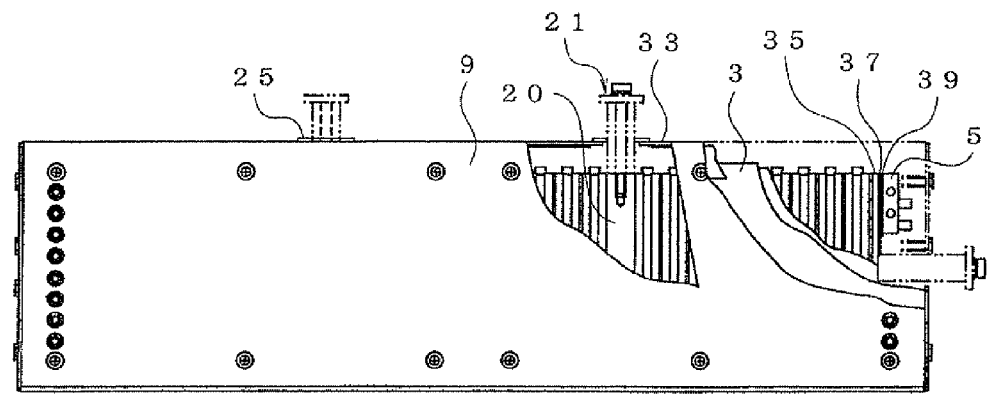
FIG. 6B is a side view of the battery module shown in FIG. 6A.
Figure 6C:
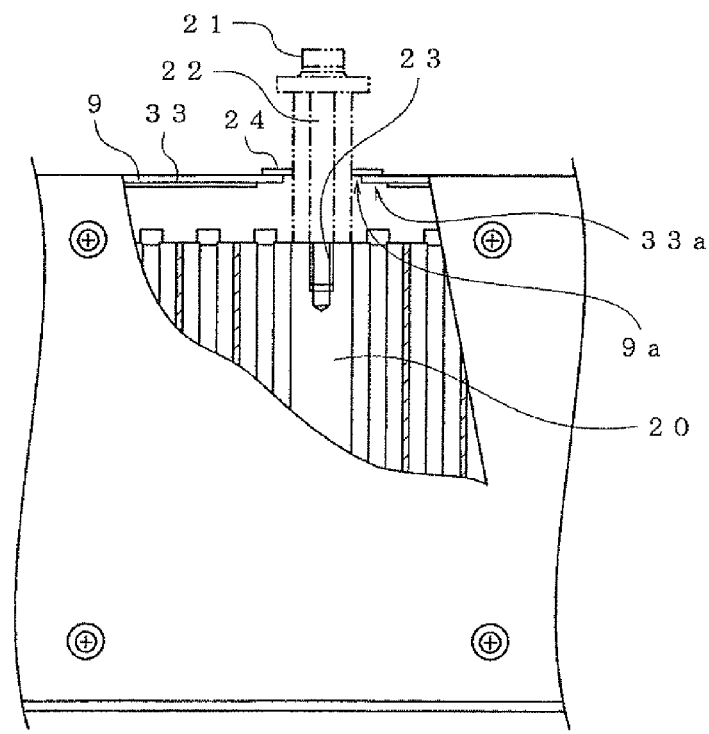
FIG. 6C is an important portion enlarged view of the battery module shown in FIG. 6B.

FIG. 6A is a plan view of the battery module B'. FIG. 6B is a side view thereof. FIG. 6C is an important portion enlarged view of FIG. 6B. In the embodiment shown in FIGS. 6A to 6C, the heat release plates 31 are respectively provided on both sides of the unit battery C. However, as shown in FIG. 2, one heat release plate 31 may be provided for two unit batteries C.

In the present embodiment, two intermediate current collectors 20 are separately provided between the first current collector 35 that is a positive electrode current collecting portion and the second current collector 36 that is a negative electrode current collecting portion. Each of the two intermediate current collectors 20 is provided between the unit batteries C. To be specific, the intermediate current collector 20 is provided such that one surface thereof contacts the first lid member 15 (FIG. 3) of one unit battery C, and the other surface thereof contacts the second lid member 16 (FIG. 3) of the other unit battery C. The battery module B' is constituted by stacking twenty-eight unit batteries C such that nine unit batteries C are provided between the second current collector and the intermediate current collector 20 located on the rear end side; nine unit batteries C are provided between the first current collector 35 and the intermediate current collector 20 located on the front end side; and ten unit batteries C are provided between the two intermediate current collectors 20. It is preferable that the intermediate current collector 20 be formed by aluminum (or aluminum alloy), which is a good conductor of electricity, subjected to nickel plating. The intermediate current collector 20 is not limited to aluminum (or aluminum alloy). The intermediate current collector 20 may be a good conductor of electricity, for example, stainless steel. Contact resistance can be reduced by the nickel plating. However, the plating may not be performed.

Since the intermediate current collector 20 is the good conductor of electricity, the electricity of one of the adjacent unit batteries C can be transmitted to the other adjacent unit battery C.

The thickness of the intermediate current collector 20 is equal to the total thickness of one unit battery C and two the heat release plates 31. Therefore, the battery module B can be converted into the battery module B' by removing one unit battery C and two heat release plates 31 from the battery module B and incorporating the intermediate current collector 20 in the battery module B. Therefore, in the battery module B', the design of the battery module B can be used, and the parts and the assembling of the battery module B can be shared.

In a case where one heat release plate 31 is provided for two unit batteries C in the battery module B, the thickness of the intermediate current collector 20 can be set to be equal to the total thickness of one unit battery C and one heat release plate 31.

The intermediate current collector 20 may be provided with passages (not shown) through which the cooling medium flows. In this case, the intermediate current collector 20 contributes to the cooling of the battery.

A screw hole 23 is formed at a substantially center portion of an upper surface of the intermediate current collector 20. Circular openings 9a and 33a are respectively formed on a top plate of the casing 9 and the upper surface plate 33 above the screw hole 23. In these openings 9a and 33a, a connecting terminal bolt 22 is threadedly engaged with the screw hole 23 from above, to attach a connecting terminal 21 to the intermediate current collector 20.

A closing circular plate 24 is provided on an upper surface of the opening 9a. The closing circular plate 24 is made of an insulating material and includes a hole which is formed at a center portion of the closing circular plate 24 and through which the connecting terminal 21 extends. The closing circular plate 24 prevents the entrance of foreign matters from outside. A closing circular plate 25 not including at its center portion the hole through which the connecting terminal 21 extends is provided on the openings 9a and 33a located above the intermediate current collector 20 at which the connecting terminal 21 is not provided.

A cable (not shown) is connected to the connecting terminal 21. The cable extends to the outside of the cabinet K to be connected to the positive power supply terminal of the battery system. A cable (not shown) is connected to the negative electrode terminal 12 of the battery module B, which is located opposite to the battery module B'. The cable extends to the outside of the cabinet to be connected to the negative power supply terminal of the battery system.

Figure 7A:
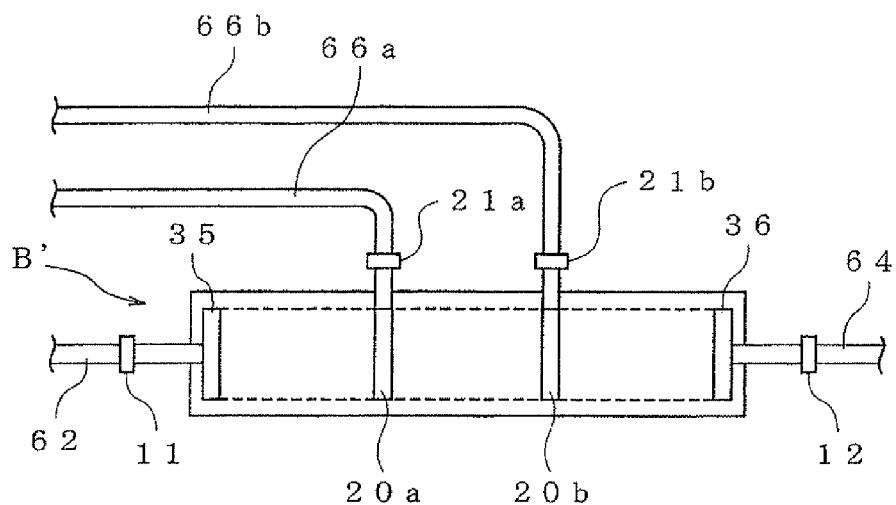
FIG. 7A is a connection diagram of a battery module constituting the battery system according to one embodiment of the present invention, the battery module including a connecting terminal.
Figure 7B:
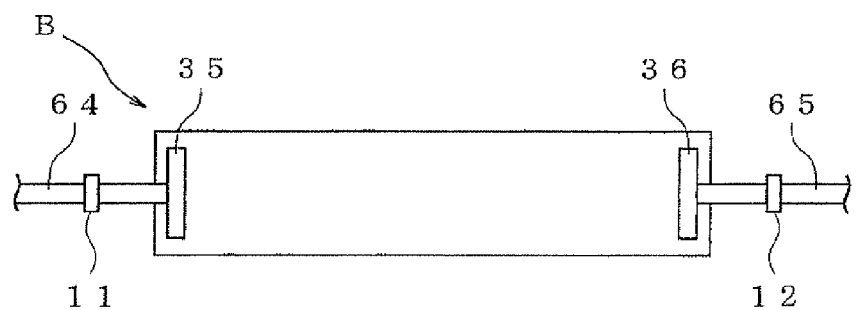
FIG. 7B is a connection diagram of a normal battery module constituting the battery system according to one embodiment of the present invention.

Next, a method of adjusting the output voltage of the battery system will be explained in reference to the drawings. FIG. 7A is a diagram for explaining the connection status of the battery module B' including the connecting terminal. FIG. 7B is a diagram for explaining the connection status of the normal battery module B. The battery module B is constituted by thirty unit batteries. The battery module B' is constituted by 28 unit batteries, and the electricity can be obtained from every nine or ten unit batteries through the connecting terminal. The number of unit batteries (the number of cells) in the battery module B may be other than thirty, and the number of connecting terminals in the battery module B' may be any one of one to four.

Figure 7C:
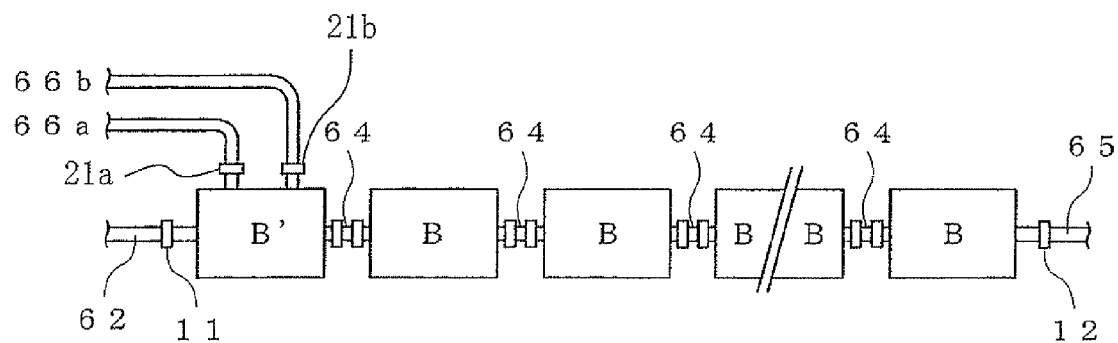
FIG. 7C is a diagram showing a connection status of the entire battery system according to one embodiment of the present invention.

As shown in FIG. 7A, cables 66a and 66b through which the electricity is obtained to the outside are respectively attached to connecting terminals 21a and 21b, and a cable 62 is attached to the positive electrode terminal 11. The negative electrode terminal 12 is connected through a cable 64 to the positive electrode terminal 11 of the adjacent battery module B. The negative electrode terminal 12 of this adjacent battery module B is connected through the cable 64 to the positive electrode terminal 11 of the further adjacent battery module B, and this is repeated. A cable 65 is connected to the negative electrode terminal 12 of a last battery module Bb. As a result, the connection status shown in FIG. 7C is formed in the entire battery system.

To be specific, the positive electrode terminal 11 of the battery module B' located on a highest potential side in the battery system is electrically connected through the cable 62 to the positive power supply terminal 81A (see FIG. 1) of the cabinet K, and the connecting terminals 21a and 21b are respectively, electrically connected through the cables 66a and 66b to the positive power supply terminals 81B and 81C (see FIG. 1) of the cabinet K. In addition, the negative electrode terminal 12 of the battery module B located on a lowest potential side in the battery system is connected through the cable 65 to the negative power supply terminal 82 (see FIG. 1) of the cabinet K.

After the cabinet K for the battery system is brought to the scene, first, the negative power supply terminal 82 of the battery system is connected to a low potential side (for example, earthed rail) of the overhead contact line, and one of three positive power supply terminals 81A, 81B, and 81C is connected to a high potential side of the overhead contact line, the overhead contact line being a load.

In this case, the battery system is constituted by 19 battery modules B and one battery module B', and its open output voltage is 817 V (=30×1.367 V×19+28×1.367). If this voltage is high due to the status of the load and the operation statuses of other devices, the cable 66a whose potential is lower than that of the cable 62 by a potential corresponding to nine unit batteries (12 V) is connected to the high potential side of the overhead contact line. If the output voltage is still high, the cable 66b whose potential is lower than that of the cable 66a by a potential corresponding to ten unit batteries is connected to the high potential side of the overhead contact line. As above, a connection portion where the overhead contact line and the battery system are connected to each other is moved from a position where the potential is high toward a position where the potential is low so as to adjust the output voltage. Finally, one positive power supply terminal connected to the overhead contact line is determined. With this, in an actual operation, usage histories of the unit batteries C in use can be equalized, and variations among the unit batteries C can be reduced. In the battery module B', one terminal connected to the earth may be finally determined such that: the battery module B' is provided on the lowest potential side in the battery system; and the connection portion where the earth and the battery module B' are connected to each other is moved from the position where the potential is low toward the position where the potential is high so as to adjust the output voltage.

In the embodiment shown in FIGS. 7A to 7C, the battery module B' is provided on the high potential side in the battery system. However, the battery system may be configured such that the battery module B' is provided on the low potential side. In a case where the battery module B' is provided on the low potential side in the battery system, in the voltage adjustment, some advantages may be achieved for security reasons.

Figure 8:
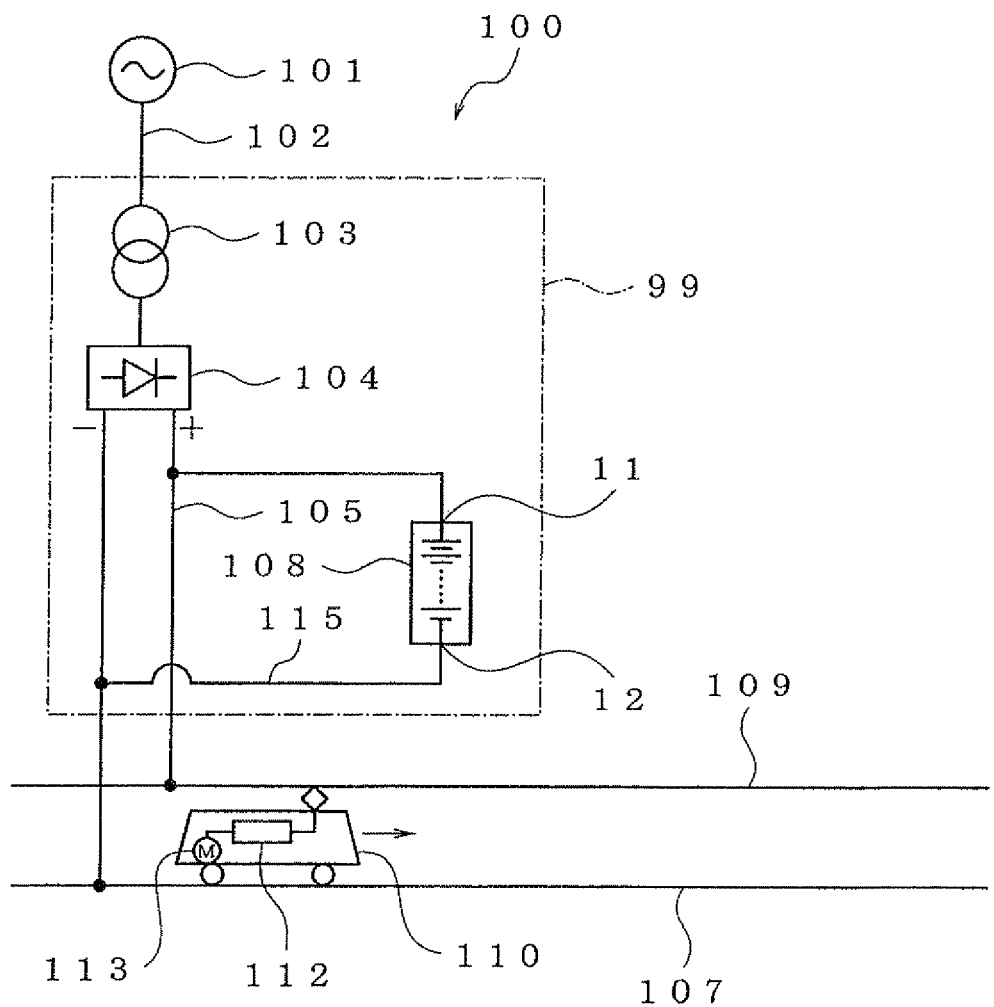
FIG. 8 is a system diagram of a power supply system for electric railcars including the battery system according to one embodiment of the present invention.

FIG. 8 is a schematic configuration diagram of a power supply system for electric railcars including the battery system of the embodiment of the present invention. In a substation 100 for electric railcars, a battery system 108 according to the present invention is directly connected to an overhead contact line 109 through a feeder 105. The positive supply terminal of the battery system 108 is connected to the feeder 105, and the negative supply terminal thereof is connected to a return circuit (rail) 107 through a line 115. In other words, the battery system 108 is connected to the overhead contact line 109 without the charge and discharge controller configured to control charging and discharging voltages.

A power supply system 99 for electric railcars includes a transformer 103 and a rectifying device 104 connected to the transformer 103. The transformer 103 receives electric power supplied from an AC power supply 101 provided by an electric power company, through an AC power line 102. A positive terminal of the rectifying device 104 is connected to the overhead contact line 109, and a negative terminal thereof is connected to the return circuit 107.

The DC power output from the rectifying device 104 is supplied through the feeder 105 and the overhead contact line 109 to an electric vehicle 110. In the electric vehicle 110, the supplied DC power is converted into AC power by, for example, an electric power controller 112 mounted on the vehicle, and the AC power is supplied to a running electric motor 113 and auxiliary machines.

For example, in a case where the electric vehicle 110 is a regenerating vehicle in a braking state, and there is no other electric vehicle which requires the regenerative electric power, the voltage of the overhead contact line increases, and the battery system 108 is charged with the regenerative electric power. In contrast, in a case where the electric vehicle 110 is an accelerating vehicle, and the voltage of the overhead contact line decreases, the electric power is supplied from the battery system 108 through the overhead contact line 109 to the accelerating vehicle.

In summary, the battery system 108 is charged when the voltage between the overhead contact line 109 and the return circuit 107 is higher than the battery voltage of the battery system 108, and the battery system 108 discharges when the voltage between the overhead contact line 109 and the return circuit 107 is lower than the battery voltage of the battery system 108. As above, the battery system 108 functions to compensate for avers and shorts of the electric power of the overhead contact line 109. Thus, the energy saving and the secure running of the electric vehicle are achieved.

In a case where the regenerative electric power is generated, and the voltage of the battery system 108 is higher than the voltage of the overhead contact line, the battery system 108 is not charged with the regenerative electric power. In addition, in a case where there is the accelerating vehicle, and the voltage of the battery system 108 is lower than the voltage of the overhead contact line, the electric power is not supplied from the battery system 108 to the overhead contact line 109. The battery system 108 effectively absorbs the regenerative electric power to realize the energy saving. In addition, the battery system 108 supplies the electric power corresponding to the shortfall to the accelerating vehicle to secure the running of the vehicle. However, as described above, if the voltage of the battery system 108 is inappropriate, the battery system 108 cannot adequately function. To avoid such inappropriate situations, the voltage of the battery system 108 needs to be adjusted.

Further, it is preferable that a battery used in the battery system according to the present invention be used in a state where the SOC of the battery is about 70 to 80%. This is because: if the SOC is too high, the capacity for absorbing the regenerative electric power becomes small; and if the SOC is too low, the electric power shortfall occurs when the electric power of the battery system is necessary. Therefore, when the output voltage of the battery system according to the present invention is adjusted on the scene, it is necessary to select the output voltage such that the SOC becomes about 70 to 80%, preferably about 80%.

As described below, the change in the voltage of the nickel-metal hydride battery relative to the SOC is small, and one feature of the nickel-metal hydride battery is that the nickel-metal hydride battery does not require the charge and discharge controller which is required by a normal battery for voltage adjustment. In order that the battery system adequately functions while maintaining this feature, the output voltage of the battery system needs to be precisely adjusted, and the battery system including the battery module having the connecting terminal according to the present invention is necessary.

Figure 9:
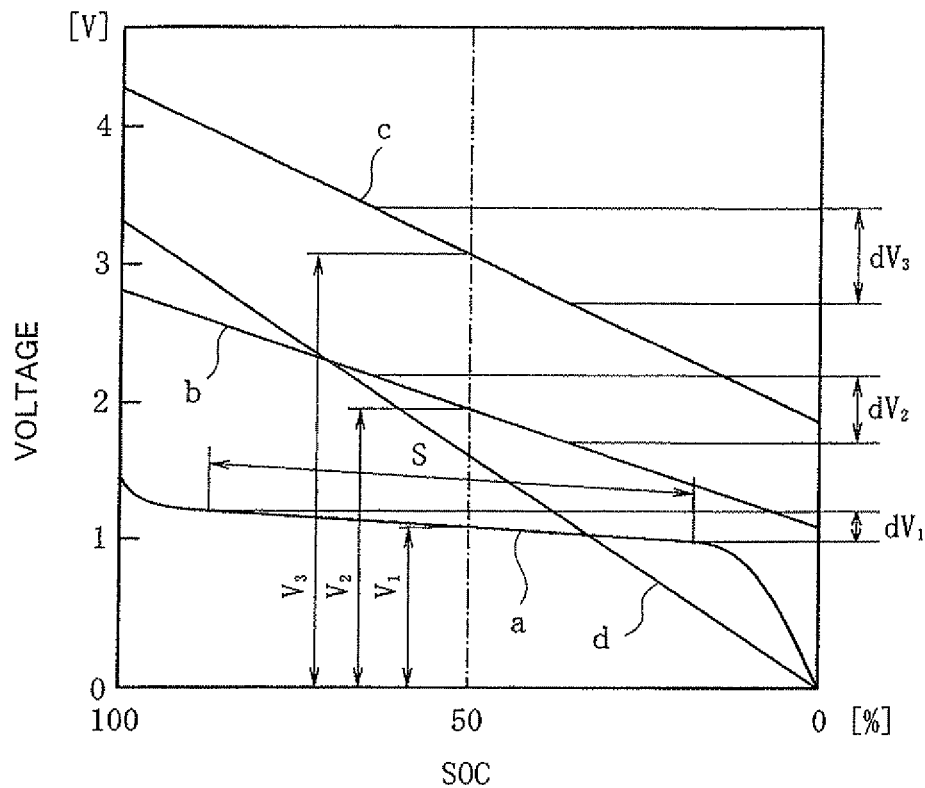

FIG. 9 is an SOC characteristic diagram showing the change in the voltage relative to the SOC (state of charge) of each of various batteries and the like. A curved line a denotes the change in the voltage of the nickel-metal hydride battery. A curved line b denotes the change in the voltage of a lead storage battery. A curved line c denotes the change in the voltage of a lithium ion battery. A curved line d denotes the change in the voltage of an electric double layer capacitor.

The change in the voltage relative to the change in the SOC is about 0.1 in the nickel-metal hydride battery, about 1.5 in the lead storage battery, about 2.0 in the lithium ion battery, and about 3.0 in the electric double layer capacitor. To be specific, if the same voltage change range is allowed, the voltage change of the nickel-metal hydride battery can be made small up to $1/15$ of that of the lead storage battery, $1/20$ of that of the lithium ion battery, or $1/30$ of that of the electric double layer capacitor.

As shown in FIG. 9, the voltage characteristic of the nickel-metal hydride battery shown by the curved line a is more stable than those of the other batteries and the like in a wide SOC range S. To be specific, the change in the voltage of the nickel-metal hydride battery is small in the wide SOC range. The changes in the voltages of the other batteries shown by the curved lines b, c, and d relative to the change in the SOC are larger than the change in the voltage of the nickel-metal hydride battery. For example, with reference to an SOC medium value, in a case where the voltage of the nickel-metal hydride battery at the SOC medium value is $V_1$, and the nickel-metal hydride battery is used such that the change in the voltage of the nickel-metal hydride battery falls within a range $dV_1$, the nickel-metal hydride battery can be used over a substantially entire SOC range. Thus, the battery capacity can be effectively utilized. In contrast, in a case where the voltage of the lead storage battery at the SOC medium value is $V_2$, and the lead storage battery is used such that the change in the voltage of the lead storage battery falls within a range $dV_2$, the lead storage battery is just used only in a narrow SOC range. Thus, the battery capacity cannot be utilized effectively. Similarly, in a case where the voltage of the lithium ion battery at the SOC medium value is $V_3$, and the lithium ion battery is used such that the change in the voltage of the lithium ion battery falls within a range $dV_3$, the lithium ion battery is just used only in a narrow SOC range. Thus, the battery capacity cannot be utilized effectively. Here, the size of the voltage change range is normalized by the medium value of the voltage, so that a relation "$dV_1/V_1=dV_2/V_2=dV_3/V_3$" is established.

Therefore, in a case where the battery system 108, in which the battery voltage when the SOC is in the middle of the range S, for example, the SOC is 50 to 70% is equal to or substantially equal to a rated output voltage of the electric railcar power supply system shown in FIG. 8, is directly connected to the overhead contact line 109 as in FIG. 8, and even if the state of charge (SOC) of the battery system 108 fluctuates by the repetition of charging and discharging of the battery system 108, the change in the battery voltage is small. Therefore, the battery capacity can be effectively utilized.

Thus, in the battery system of the present invention, an allowable range of the change in the voltage of the overhead contact line covers most of the SOC range. Therefore, the battery capacity is effectively utilized without the charge and discharge controller.

The invention claimed is:

1. A battery system connected to an electrical load comprising:
    a plurality of battery modules configured to be connected in series, each of the battery modules being configured by stacking a plurality of unit batteries between a positive electrode terminal and a negative electrode terminal such that the plurality of unit batteries are connected in series; and
    at least one connecting terminal provided between the positive electrode terminal and the negative electrode terminal of at least one of the plurality of battery modules, electricity being obtained through the at least one connecting terminal, the at least one connecting terminal having potential between potential of the positive electrode terminal and potential of the negative electrode terminal, wherein
    the plurality of battery modules include a first battery module and a second battery module different from each other,
    the connecting terminal is provided at the first battery module,
    the negative electrode terminal of the second battery module has the lowest potential among the negative electrode terminals of the plurality of respective battery modules,
    the negative electrode terminal of the second battery module is connected to the electrical load, and
    only one terminal selected from the positive electrode terminal and the at least one connecting terminal of the first battery module is connected to the electrical load such that an output voltage of the battery system is adjusted.

2. The battery system according to claim 1, wherein:
    the at least one connecting terminal comprises a plurality of connecting terminals; and
    the plurality of connecting terminals are respectively connected to a plurality of positions which are located in the battery module and are different in potential from one another.

3. The battery system according to claim 1, wherein the unit batteries are nickel-metal hydride batteries.

4. The battery system according to claim 1, further comprising at least one intermediate current collector provided between the unit batteries in the at least one of the plurality of battery modules, the at least one connecting terminal being respectively attached to the at least one intermediate current collector.

5. The battery system according to claim 4, wherein the intermediate current collector is subjected to nickel plating.

6. The battery system according to claim 4, further comprising at least one heat release plate configured to release heat generated in the unit batteries, the at least one heat release plate being provided between the unit batteries, wherein a thickness of the intermediate current collector is equal to a total thickness of one unit battery and one heat release plate or a total thickness of one unit battery and two heat release plates.

7. The battery system according to claim 1, further comprising a cabinet, the battery modules being stored in the cabinet.

8. The battery system according to claim 7, further comprising a plurality of power supply terminals for external connection, the cabinet being provided with the plurality of power supply terminals, the plurality of power supply terminals respectively being electrically connected to the connecting terminal of the first battery module, the positive electrode terminal of the first battery module, and the negative electrode terminal of the second battery module.

9. The battery system according to claim 1, wherein the connecting terminal is detachable.

10. A power supply system for electric railcars used in a substation for the electric railcars, comprising:
    a transformer configured to receive electricity through an AC power line;
    a rectifying device connected to the transformer;
    a feeder connected to the rectifying device;
    a return conductor; and
    a battery system directly connected to the feeder, wherein the battery system includes:
        a plurality of battery modules configured to be connected in series, each of the plurality of battery modules being configured by stacking a plurality of unit batteries between a positive electrode terminal and a negative electrode terminal such that the plurality of unit batteries are connected in series; and
        at least one connecting terminal provided between the positive electrode terminal and the negative electrode terminal of at least one of the plurality of battery modules, electricity being obtained through the at least one connecting terminal, the at least one connecting terminal having potential between potential of the positive electrode terminal and potential of the negative electrode terminal, and
    the plurality of battery modules include a first battery module and a second battery module different from each other,
    the connecting terminal is provided at the first battery module,
    the negative electrode terminal of the second battery module has the lowest potential among the negative electrode terminals of the plurality of respective battery modules, the negative electrode terminal of the second battery module is connected to the return conductor, and only one terminal selected from the positive electrode terminal and the at least one connecting terminal of the first battery module is directly connected to the feeder such that an output voltage of the battery system is adjusted.

11. The power supply system for electric cars according to claim 10, wherein:

the at least one connecting terminal comprises a plurality of connecting terminals; and the plurality of connecting terminals are respectively connected to a plurality of positions which are located in the battery module and are different in potential from one another.

12. The power supply system for electric cars according to claim 10, wherein the unit batteries are nickel-metal hydride batteries.

13. The power supply system for electric cars according to claim 10, further comprising at least one intermediate current collector provided between the unit batteries in the at least one of the plurality of battery modules, the at least one connecting terminal being respectively attached to the at least one intermediate current collector.

14. The power supply system for electric cars according to claim 13, wherein the intermediate current collector is subjected to nickel plating.

15. The power supply system for electric cars according to claim 13, further comprising at least one heat release plate configured to release heat generated in the unit batteries, the at least one heat release plate being provided between the unit batteries, wherein a thickness of the intermediate current collector is equal to a total thickness of one unit battery and one heat release plate or a total thickness of one unit battery and two heat release plates.

16. The power supply system for electric cars according to claim 10, further comprising a cabinet, the battery modules being stored in the cabinet.

17. The power supply system for electric cars according to claim 16, further comprising a plurality of power supply terminals for external connection, the cabinet being provided with the plurality of power supply terminals, the plurality of power supply terminals respectively being electrically connected to the connecting terminal of the first battery module, the positive electrode terminal of the first battery module, and the negative electrode terminal of the second battery module.

18. The power supply system for electric cars according to claim 10, wherein the connecting terminal is detachable.

* * * * *